3,210,854
ELECTRIC APPARATUS FOR PREVENTING A MEASURING TRACER FROM ENGAGING INTO A GROOVE OF A ROTATING WORKPIECE
Karl-Heinz Wolfram, Fellbach, and Hans R. Warsewa, Stuttgart-Bad Cannstatt, Germany, assignors to Daimler-Benz Aktiengesellschaft, Stuttgart-Unterturkheim, Germany
Filed Mar. 1, 1963, Ser. No. 262,172
Claims priority, application Germany, Mar. 3, 1962, D 38,288
11 Claims. (Cl. 33—172)

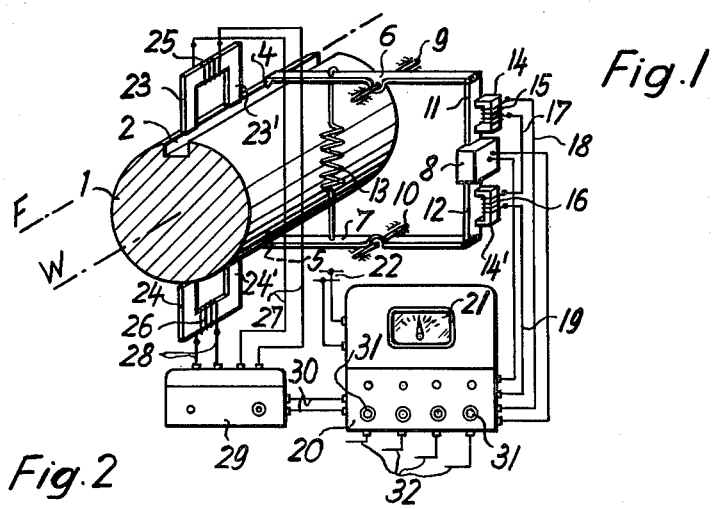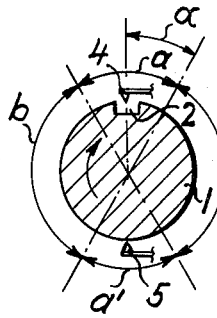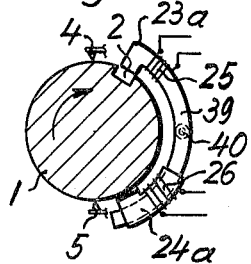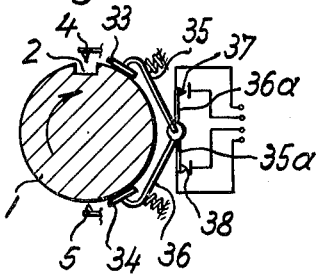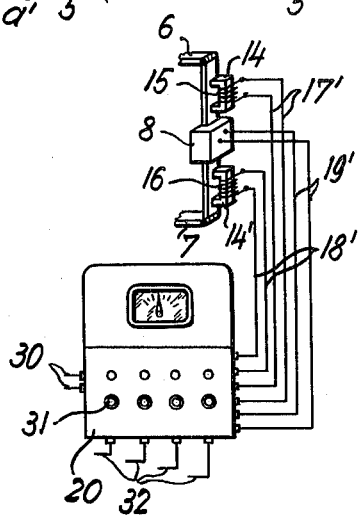
INVENTORS
KARL-HEINZ WOLFRAM
HANS R. WARSEWA
BY Dicke and Craig
ATTORNEYS United States Patent Office 3,210,854
Patented Oct. 12, 1965

The present invention relates to an electric apparatus which is operatively associated with an instrument for measuring the diameter of a rotating workpiece while being machined, and which is adapted to prevent the measuring tracer or tracers of this instrument from engaging into a longitudinal groove or keyway in the peripheral surface of the workpiece.

Prior to this invention, such a measuring instrument was equipped with devices which operated either electromechanically or purely electrically to lock the measuring tracer or tracers so as not to be pressed in the direction toward the peripheral surface of a rotating workpiece as long as the grooved part thereof was passing a tracer. Among these devices there is one especially in which a second tracer arm which is provided with an energized coil is associated with each measuring tracer. These second tracer arms are located immediately adjacent to the measuring tracers at opposite sides of the workpiece. While the measuring tracers directly engage with the rotating workpiece, the ends of the second tracer arms trace the latter inductively and are therefore separated from the workpiece by air gaps. When the groove in the rotating workpiece passes one of these second tracers, the induction voltage changes and this changed voltage is transmitted as an impulse to an amplifier which is connected to an electromagnet which then causes the measuring tracer to be temporarily locked so as not to drop into the groove in the workpiece. A disadvantage of this mechanism is that the electromagnetic device operates with considerable inertia and therefore does not reliably prevent the measuring tracers from entering slightly into the groove. Even such a slight entry results in violent deflections of the pointer of the indicating instrument. Furthermore, the sensitive ends of the measuring tracers are then easily damaged or ruined entirely.

It is an object of the present invention to provide a locking mechanism which eliminates the inertia of the known devices and absolutely prevents the measuring tracer or tracers from engaging into a longitudinal groove or keyway of a rotating workpiece while the latter is being machined. Whereas the known locking devices function in such a manner that normally the measuring tracer or tracers are unlocked and pressed against the workpiece and are locked in position by an impulse which is produced by the groove, it is the principal feature of the invention that the measuring tracer is normally held in a locked position from which it is released as soon as the groove moves past this tracer, but that the releasing impulse is retarded and not transmitted to the measuring tracer until the groove has moved entirely past the tracer.

The features and advantages of the present invention will become more clearly apparent from the following description thereof which is to be read with reference to the accompanying diagrammatic drawings of several embodiments of the invention, in which—

FIGURE 1 shows a measuring apparatus in which the locking action is controlled electromechanically and the measuring and groove-tracing points are in axial alignment with each other;

FIGURE 2 shows a diagram illustrating the distribution of the measuring and locking zones around a grooved shaft;

FIGURE 3 shows an apparatus in which the groove-tracing points of the electromagnetic locking mechanism are angularly offset relative to the positions of the measuring tracers;

FIGURE 4 shows a groove-tracing mechanism which is likewise angularly offset relative to the positions of the measuring tracers but operates electromechanically; while FIGURE 5 shows a modification of the circuit of the locking mechanism according to FIGURE 1.

In all of the drawings, the shaft to be machined is indicated at 1 and its longitudinal groove or keyway at 2. While being machined, for example, ground, the shaft is measured in a manner known as such at diametrically opposite points by the direct engagement of the end tips 4 and 5 of a pair of measuring tracers 6 and 7 which are connected to a measuring transformer or the like 8. Each tracer arm 6 and 7 is pivotable about a pin 9 or 10, and on the rear end of each tracer arm a flat plate 11 or 12 is pivotably connected which is adapted to enter to different depths into the transformer 8. The two ends 4 and 5 of the measuring tracers are drawn toward each other by the tension of a weak spring 13. Closely adjacent to each plate 11 and 12 an electromagnet 14 or 14' is mounted. The coils 15 and 16 of these magnets are connected at one side in series by a line 17 and at the other side by the lines 18 and 19 to a current-supply, indicating and control instrument 20, 21, which, in turn, is connected by the lines 22 to the main power supply.

Directly adjacent to the end tips 4 and 5 of the measuring tracers 6 and 7 a pair of electromagnets is mounted, the coils 25 and 26 of which are connected by the lines 27 and 28 to a control unit 29, while the ends of the pole pieces 23, 23' and 24, 24', respectively, of these magnets are disposed within straight lines F which extend parallel to the axis W of shaft 1 and are also in line with the tips 4 and 5 of the measuring tracers. The control unit 29 is connected by the lines 30 to the instrument 20, 21 which aside from its indicating part contains the control relays for the control mechanism of the machine tool, the control knobs 31 for the control impulses, and the terminals of the lines 32 for transmitting these control impulses to the machine.

If shaft 1 is, for example, being ground and the diameter of the shaft approaches the desired final value, the instrument 20, 21 will then indicate the amount in sum which still remains to be ground off. At the same time, the rate of the infeed of the grinding wheel will be varied in accordance with the setting of the control knobs 31.

According to the invention, the control unit 29 contains a further retarding device of a type known as such for the purpose of retarding the locking and releasing impulses.

The operation of the mechanism as described above is as follows: As illustrated in FIGURE 2, it is the object of the invention to hold the measuring tracers 6 and 7 and their tips 4 and 5 in a locked position by the locking action of the electromagnets 15 and 16 during the periods in which the groove 2 in the rotating shaft 1 travels along the peripheral distances a and a', but to permit them to move freely during the periods in which the groove travels along the peripheral distances b and b'. Whereas in the previous electric measuring apparatus of this type the locking means operated according to the principle that normally the measuring tracers were released and freely movable toward the workpiece and were only locked by the impulses which were produced by the groove when passing the tracer tips 4 and 5 and the pole pieces of the tracer magnets, the apparatus according to the invention is designed and operates according to the principle that normally the measuring tracers are held in the locked position from which each tracer is released by the impulse which is given by the groove, but that this release is retarded for a sufficient length of time by the action of the control unit 29 until the groove has completely passed beyond the respective measuring tracer. The release therefore does not actually occur until the groove has traveled, for example, past the upper measuring tracer 4 and has reached the position x as shown in FIGURE 2.

The point of time of the release may be varied by an adjustment of the retarding device in the control unit 29. After a certain period of time which is likewise adjustable, the locking action becomes again effective when the tracer point 4 leaves the range b, as shown in FIGURE 2. The same procedure occurs when the groove approaches the tracer point 5. The circuit may be designed so that only the particular measuring tracer 6 or 7 which is being passed by the groove will be locked or that both tracers will be locked simultaneously, as in the embodiment according to FIGURE 1. The locking operation occurs as the result of the action of the electromagnets 14 and 14' which at the desired instant prevents temporarily any movement of the plates 11 and 12 which are suspended on the tracer arms 6 and 7 and thus also of the tracers themselves.

FIGURE 5 illustrates a modification of the circuit as shown in FIGURE 1, in which alternately only one tracing lever is locked, while the other is still freely movable. In this case, coils 15 and 16 of the electromagnets 14 and 14' and the transformer 8 are separately connected by the lines 17', 18', and 19', respectively, to the instrument 20. The same effect would also be attained if the connecting line 17 according to FIGURE 1 would be connected by a further line to the instrument 20. Both circuits have the result that only that tracer 4 or 5 will be released for its measuring operation which has just been passed by the groove 2. The number of releasing impulses which are transmitted to one of the coils 15 or 16 is therefore only one half of the number which are transmitted if both tracers are released simultaneously. Consequently, each tracer can measure during a much longer peripheral distance with the result that the indicated result is much less subject to "jumping" and therefore more accurate.

It is possible to omit at least one of the retarding devices in the control unit 29 by shifting the position of the pole pieces in the direction of rotation of shaft 1, for example, by an angle $\alpha$, as shown in FIGURE 2, relative to the position of the tracer points 4 and 5 on the tracer arms 6 and 7, so that the pole pieces 23a and 24a are then located in the position as shown in FIGURE 3. The release of the measuring tracers 4 and 5 will then occur not until the groove 2 has traveled from its highest position according to FIGURE 2 about the angle $\alpha$ to the position according to FIGURE 3 in which it is located underneath the pole piece 23a. The induction voltage which then occurs in coil 25 again transmits an impulse to the control unit 29 for releasing the tracers 6 and 7, but this time without the action of a special retarding device and only with a retardation in accordance with the angle $\alpha$ and the speed of rotation of the shaft. As soon as groove 2 has passed the second pole piece 24a, the locking action starts again and prevents the lower tracer 5 from engaging into groove 2.

In place of the electroinductive arrangement according to FIGURES 1 and 3, it is also possible to employ an electromechanic mechanism as illustrated, for example, in FIGURE 4. In this mechanism, two wipers 33, 34 which are again angularly offset with respect to the tracer points 4 and 5 and are secured to two-armed levers 35, 35a and 36, 36a, respectively, engage under spring pressure with the peripheral surface of shaft 1. Each of the lever arms 35a and 36a actuates a switch 37 or 38. This apparatus operates in principle like the apparatus according to FIGURE 3. At the moment when groove 2 passes underneath the wiper 33, the latter moves slightly closer to the axis of shaft 1 and thereby closes the switch 38, whereby the measuring keys 4 and 5 become unlocked. As soon as groove 2 passes the lower wiper 34, switch 37 is actuated whereby the measuring tracers are again locked in position.

In order to permit the locking distances a, a' and the measuring distances b, b', as indicated in FIGURE 2, to be adjusted, suitable means may be provided for varying the distance between the pole pieces 23a and 24a in the inductive apparatus according to FIGURE 3, for example, by mounting one or both pole pieces on the yoke 39 so as to be slidable relative to each other and to be locked in different positions thereon. Similarly it is possible to mount the angular levers 35, 35a and 36, 36a of the electromechanical apparatus according to FIGURE 4 on different pivot pins and the latter on a suitable guide so as to be adjustable relative to each other and to be locked in different positions relative to the shaft 1. A similar adjusting device may also be provided on the yoke 39 according to FIGURE 3 which may be made, for example, of two sections which may be connected by a suitable joint 40 so as to be pivotable relative to each other. Finally, the second pair of pole pieces 24 or the second wiper 34 may also be omitted if the retarding device is provided in the control unit 29 which at a certain adjustable length of time after the parts 23 or 33 have started the measuring operation again locks the tracers before groove 2 passes the lower tracer 5.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In an apparatus for measuring the diameter of a grooved workpiece during the rotation thereof having at least one measuring tracer engaging with the peripheral surface of the rotating workpiece and means for indicating the results measured by said tracer, the improvement esentially consisting of an electric mechanism for preventing the tracer from engaging into the groove in said rotating workpiece comprising:

locking means for normally maintaining said tracer in a locked position, detection means for producing a control signal in response to predetermined orientation of said rotating workpiece as determined by detection of said groove, and control means responsive to said control signal for releasing said tracer for a predetermined time by deactivation of said locking means, said predetermined time being based upon the speed of rotation of said workpiece and the orientation of said tracer and said detection means, said detection means and said tracer being oriented adjacent said workpiece such that said control signal is produced at the moment when said groove is adjacent said tracer, and means for delaying the transmission of said control signal to said control means for a time sufficient to allow said groove to completely pass said tracer.

2. In an apparatus for measuring the diameter of a grooved workpiece during the rotation thereof having at least one measuring tracer engaging with the peripheral surface of the rotating workpiece and means for indicating the results measured by said tracer, the improvement essentially consisting of an electric mechanism for preventing the tracer from engaging into the groove in said rotating workpiece comprising:

locking means for normally maintaining said tracer in a locked position, detection means for producing a control signal in response to predetermined orientation of said rotating workpiece as determined by detection of said groove, and control means responsive to said control signal for releasing said tracer for a predetermined time by deactivation of said locking means, said predetermined time being based upon the speed of rotation of said workpiece and the orientation of said tracer and said detection means, said detection means and said tracer being oriented adjacent said workpiece such that said control signal is produced at the moment when said groove is adjacent said tracer, and means for delaying the transmission of said control signal to said control means for a time sufficient to allow said groove to completely pass said tracer, said detection means including at least one electromagnet cooperating in circuit relationship with said rotating workpiece producing said control signal in the form of current fluctuations in response to detection of said groove.

3. In an apparatus for measuring the diameter of a grooved workpiece during the rotation thereof having at least one measuring tracer engaging with the peripheral surface of the rotating workpiece and means for indicating the results measured by said tracer, the improvement essentially consisting of an electric mechanism for preventing the tracer from engaging into the groove in said rotating workpiece comprising:

locking means for normally maintaining said tracer in a locked position, detection means for producing a control signal in response to predetermined orientation of said rotating workpiece as determined by detection of said groove, and control means responsive to said control signal for releasing said tracer for a predetermined time by deactivation of said locking means, said predetermined time being based upon the speed of rotation of said workpiece and the orientation of said tracer and said detection means, said detection means including at least one electromagnet cooperating in circuit relationship with said rotating workpiece producing said control signal in the form of current fluctuations in response to detection of said groove, said detection means and said tracer being oriented adjacent said workpiece such that said detection means is angularly offset in the direction of rotation of said workpiece relative to the position of said tracer.

4. In an apparatus for measuring the diameter of a grooved workpiece during the rotation thereof having at least one measuring tracer engaging with the peripheral surface of the rotating workpiece and means for indicating the results measured by said tracer, the improvement essentially consisting of an electric mechanism for preventing the tracer from engaging into the groove in said rotating workpiece comprising:

locking means for normally maintaining said tracer in a locked position, detection means for producing a control signal in response to predetermined orientation of said rotating workpiece as determined by detection of said groove, and control means responsive to said control signal for releasing said tracer for a predetermined time by deactivation of said locking means, said predetermined time being based upon the speed of rotation of said workpiece and the orientation of said tracer and said detections means, said detection means and said tracer being oriented adjacent said workpiece such that said control signal is produced at the moment when said groove is adjacent said tracer, and means for delaying the transmission of said control signal to said control means for a time sufficient to allow said groove to completely pass said tracer, said detection means including at least one electromagnet cooperating in circuit relationship with said rotating workpiece producing said control signal in the form of current fluctuations in response to detection of said groove, said detection means and said tracer being in axial alignment with each other and substantially parallel to said groove.

5. In an apparatus for measuring the diameter of a grooved workpiece during the rotation thereof having at least one measuring tracer engaging with the peripheral surface of the rotating workpiece and means for indicating the results measured by said tracer, the improvement essentially consisting of an electric mechanism for preventing the tracer from engaging into the groove in said rotating workpiece comprising:

locking means for normally maintaining said tracer in a locked position, detection means for producing a control signal in response to predetermined orientation of said rotating workpiece as determined by detection of said groove, and control means responsive to said control signal for releasing said tracer for a predetermined time by deactivation of said locking means, said predetermined time being based upon the speed of rotation of said workpiece and the orientation of said tracer and said detection means, said detection means and said tracer being oriented adjacent said workpiece such that said detection means is angularly offset in the direction of rotation of said workpiece relative to the position of said tracer, said detection means including at least one electromagnet cooperating in circuit relationship with said rotating workpiece and means for adjusting the position of said electromagnet in the peripheral direction of said workpiece relative to said tracer.

6. In an apparatus for measuring the diameter of a grooved workpiece during the rotation thereof having at least one measuring tracer engaging with the peripheral surface of the rotating workpiece and means for indicating the results measured by said tracer, the improvement essentially consisting of an electric mechanism for preventing the tracer from engaging into the groove in said rotating workpiece comprising:

locking means for normally maintaining said tracer in a locked position, detection means for producing a control signal in response to predetermined orientation of said rotating workpiece as determined by detection of said groove, and control means responsive to said control signal for releasing said tracer for a predetermined time by de-activation of said locking means, said detection means including at least one groove sensing element associated with said tracer and being pivotally mounted adjacent to said workpiece so as to accommodate workpieces of different diameters.

7. In an apparatus for measuring the diameter of a grooved workpiece during the rotation thereof having at least one measuring tracer engaging with the peripheral surface of the rotating workpiece and means for indicating the results measured by said tracer, the improvement essentially consisting of an electric mechanism for preventing the tracer from engaging into the groove in said rotating workpiece comprising:

locking means for normally maintaining said tracer in a locked position, detection means for producing a control signal in response to predetermined orientation of said rotating workpiece as determined by detection of said groove, and control means responsive to said control signal for releasing said tracer for a predetermined time by de-activation of said locking means, said predetermined time being based upon the speed of rotation of said workpiece and the orientation of said tracer and said detection means, said detection means and said tracer being oriented adjacent said workpiece such that said control signal is produced at the moment when said groove is adjacent said tracer, and means for delaying the transmission of said control signal to said control means for a time sufficient to allow said groove to completely pass said tracer, said detection means including at least one electromagnet cooperating in circuit relationship with said rotating workpiece producing said control signal in the form of current fluctuations in response to detection of said groove, said control means including means for selectively varying the time for which said tracer is released.

8. In an apparatus for measuring the diameter of a grooved workpiece during the rotation thereof having a pair of measuring tracers engaging at diametrically opposite points of the workpiece with the peripheral surface thereof and means for indicating the results measured by said tracers, the improvement essentially consisting of an electric mechanism for preventing the tracer from engaging into the groove in said rotating workpiece comprising:

circuit means including an electromagnet associated with each tracer and positioned adjacent said workpiece at diametrically opposite points, each electromagnet being oriented in circuit relation to said workpiece so as to produce a current impulse in said circuit means in response to detection of said groove, locking means normally maintaining said tracers in a fixed position, control means responsive to said current impulse for releasing said measuring tracers by de-activation of said locking means, said control means including means for delaying release of said tracers for a time after generation of said current impulse and timing means for re-activating said locking means after a predetermined time based upon the speed of rotation of said workpiece and the orientation of said tracers in relation to their associated electromagnets.

9. In an apparatus for measuring the diameter of a grooved workpiece during the rotation thereof having a pair of measuring tracers engaging at diametrically opposite points of the workpiece with the peripheral surface thereof and means for indicating the results measured by said tracers, the improvement essentially consisting of an electric mechanism for preventing the tracer from engaging into the groove in said rotating workpiece comprising:

circuit means including an electromagnet associated with each tracer and positioned adjacent said workpiece at diametrically opposite points, each electromagnet being oriented in circuit relation to said workpiece so as to product a current impulse in said circuit means in response to detection of said groove, locking means normally maintaining said tracers in a fixed position, control means responsive to said current impulse for releasing said measuring tracers by de-activation of said locking means, said control means including means for delaying release of said tracers for a time after generation of said current impulse and timing means for re-activating said locking means after a predetermined time based upon the speed of rotation of said workpiece and the orientation of said tracers in relation to their associated electromagnets, each electromagnet and its associated tracer being oriented adjacent said workpiece so that said current impulse is produced simultaneoeusly with passage of said groove beneath one of said tracers.

10. In an apparatus for measuring the diameter of a grooved workpiece during the rotation thereof having a pair of measuring tracers engaging at diametrically opposite points of the workpiece with the peripheral surface thereof and means for indicating the results measured by said tracers, the improvement essentially consisting of an electric mechanism for preventing the tracer from engaging into the groove in said rotating workpiece comprising:

circuit means including an electromagnet associated with each tracer and positioned adjacent said workpiece at diametrically opposite points, each electromagnet being oriented in circuit relation to said workpiece so as to produce a current impulse in said circuit means in response to detection of said groove, locking means normally maintaining said tracers in a fixed position, control means responsive to said current impulse for releasing said measuring tracers by de-activation of said locking means, said control means including means for delaying release of said tracers for a time after generation of said current impulse and timing means for re-activating said locking means after a predetermined time based upon the speed of rotation of said workpiece and the orientation of said tracers in relation to their associated electromagnets, each electromagnet and its associated tracer being oriented adjacent said workpiece so that said current impulse is produced simultaneously with passage of said groove beneath one of said tracers, said locking means including means associated with each electromagnet for fixing the position of its associated tracer, said control means being effective to de-activate only that means associated with the electromagnet producing said current impulse.

11. In an apparatus for measuring the diameter of a grooved workpiece during the rotation thereof having a pair of measuring tracers engaging at diametrically opposite points of the workpiece with the peripheral surface thereof and means for indicating the results measured by said tracers, the improvement essentially consisting of an electric mechanism for preventing the tracer from engaging into the groove in said rotating workpiece comprising:

circuit means including an electromagnet associated with each tracer and positioned adjacent said workpiece at diametrically opposite points, each electromagnet being oriented in circuit relation to said workpiece so as to produce a current impulse in said circuit means in response to detection of said groove, locking means normally maintaining said tracers in a fixed position, control means responsive to said current impulse for releasing said measuring tracers by de-activation of said locking means, said control means including means for delaying release of said tracers for a time after generation of said current impulse and timing means for re-activating said locking means after a predetermined time based upon the speed of rotation of said workpiece and the orientation of said tracers in relation to their associated electromagnets, each electromagnet and its associated tracer being oriented adjacent said workpiece so that said current impulse is produced simultaneously with passage of said groove beneath one of said tracers, said locking means including means associated with each electromagnet for fixing the position of its associated tracer, said control means being effective to de-activate both means in response to a current impulse from either electromagnet.

References Cited by the Examiner
FOREIGN PATENTS 732,480    3/43    Germany.
1,124,710    3/62    Germany.

ISAAC LISANN, *Primary Examiner.*